Mar. 13, 1923.
C. J. G. SÓRENSEN
1,448,421
PROCESS OF PURIFYING RAW CANE JUICE
Filed July 22, 1920
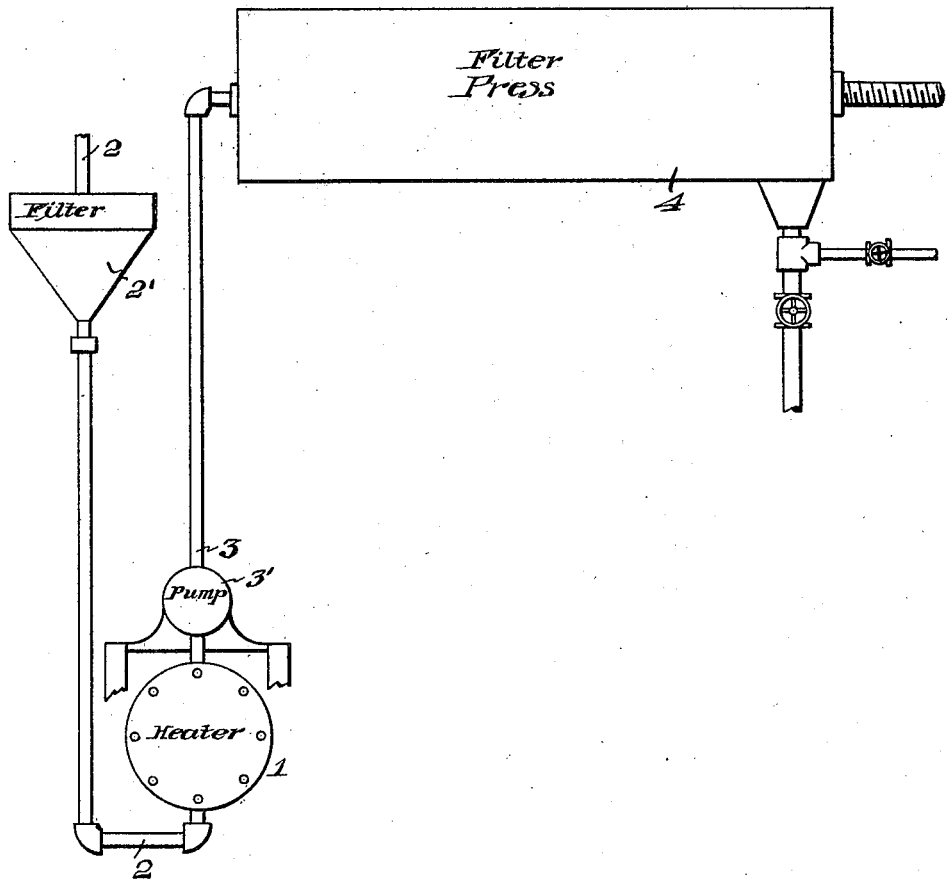
Inventor:
Carl J. H. Sorensen,
By W.H. Swenarton,
His Attorney.

Patented Mar. 13, 1923.

1,448,421

UNITED STATES PATENT OFFICE.

CARL J. G. SÓRENSEN, OF FREDERIKSTED, ST. CROIX, VIRGIN ISLANDS.

PROCESS OF PURIFYING RAW CANE JUICE.

Application filed July 22, 1920. Serial No. 398,247.

*To all whom it may concern:*

Be it known that I, CARL J. G. SÓRENSEN, a subject of the King of Denmark, and a resident of Frederiksted, Island of St. Croix, Virgin Islands, U. S. A., have invented a new and useful Improvement in Processes of Purifying Raw Cane Juice, of which the following is a specification.

This invention relates to the clarification of the raw juice extracted from the sugar cane and has for its particular objects a very material reduction in the time of treatment at present required, the substantial elimination of settling tanks in such clarification and a very decided improvement in the quality of the resultant juice and the sugar extracted therefrom, as well as to obtain other advantages hereinafter described.

Heretofore in the process for defecating, decolorizing or clarifying sugar juice, both from sugar cane and sugar beets, it has been customary, in order to effect a filtration of all the juice, to use not only several per cent of milk of lime but also considerable quantities of other chemicals, including amongst others sulfur dioxid, phosphoric acid and the like, such for example as described in Patent No. 997,605. Such prior processes, however, are not only expensive, because of the amount of chemicals and labor involved, but, owing to the time of operation required, the output was greatly restricted as compared with a continuous process such as hereinafter described and furthermore the resultant products were often unsatisfactory.

My investigations have led to the discovery that the clarification can be accomplished more thoroughly, as well as more economically and expeditiously, if substantially all of the fine cane fibres, commonly termed bagacillio, are retained in the juice and the juice containing the same is heated in a closed vessel and then is conducted immediately, without exposure to the external atmosphere, into a closed filter, such heating and filtering operations being conducted under such conditions that the temperature of the liquid, particularly during the heating operation, is in excess of the boiling point thereof.

My invention is fully set forth in the following description and drawing, forming a part thereof, in which the figure shown is a diagrammatic view of an apparatus suitable for carrying out my invention, the same comprising a digester or heater 1 having an inlet 2 and outlet 3, which latter communicates directly with a pressure filter-press 4.

In carrying out my invention I preferably proceed as follows:

The raw cane juice, in the original condition in which it is extracted, is first strained through a coarse strainer, for example a plate strainer having about 225 apertures to the square inch each from .03″ to .04″ in diameter, in order to remove coarse material therefrom without appreciably removing the fine fibrous cane particles, i. e., the bagacillio. The acidity of the juice is then neutralized by tempering with the requisite quantity of milk of lime while constantly agitating the liquid with air in order to effect thorough neutralization of the entire mass, and the intimate admixture of the solid and liquid portions thereof.

While I preferably employ milk of lime as a neutralizing agent, owing to its cheapness, it will be obvious to those skilled in the art that barium hydroxide, sodium hydroxide or a like neutralizing agent may, if desired, be employed in lieu thereof as the essential object of such neutralization is to prevent inversion such as would occur if the normal acidity of the juice was unneutralized prior to such treatment.

The thoroughly mixed and neutralized juice is then pumped or otherwise conducted into an autoclave heater wherein it is subjected to sufficient pressure relative to the boiling point of the liquid at the pressure of operation to prevent the boiling and frothing thereof. For ordinary juice which boils at atmospheric pressure at less than 101° C., I maintain a pressure higher than that corresponding to a boiling point of 102° C. and have found that with a pressure of forty pounds per square inch excellent results are obtained by my method if the temperature of the juice in the heater is raised to between 108° and 110° C. and the juice is caused to constantly flow thru the heater en route to the filter. The temperature in the heater should in no event be below 70° C., the coagulating point of albuminous matter.

From the heater, the juice still containing substantially all of the original bagacillio is pumped directly thru the filter, such for example as the ordinary plate and frame filter press, preferably without exposure to the open air and without substantially varying the pressure thereon, but in no event should the juice be allowed to settle in sedimentation tanks and the juice tapped off relatively free from scums and sediment in accordance with the now common procedure, as it then becomes impossible to secure the beneficial results secured by my method of treatment.

The filtered juice obtained by the above procedure is of a highly desirable light color, boils readily, is remarkably free from bagacillio and foreign impurities, which fact greatly enhances its keeping qualities, and upon concentration and crystallization produces prime, dry sugar crystals which are exceedingly dense, hard, and of high purity, being especially low in ash, water, gum and bagacillio content.

Among the further advantages of my process in addition to its simplicity and the absence of the need for employing very substantial quantities of chemicals therein in order to filter all the juice, are the following:

1. The absence of any sedimentation stage reduces considerably the storage capacity required in the plant, it avoids the annoyance of re-heating the juice and adding large quantities of additional lime as is often the case when excess cooling occurs, with consequent needless loss of heat, and it effects a considerable saving in the time of treatment required, since in my process the juice can be pumped continuously through the various stages without necessitating a stoppage of from two to three hours' time as now required in those processes where sedimentation is relied upon to separate the scums and sediments.

2. The presence of the bagacillio in the filtering operation is peculiarly advantageous, since this material together with the albumens and insoluble gums constitutes a remarkably effective self-contained filtering medium which, collecting on the filter plates, forms a homogeneous layer that prevents the passage of objectionable impurities while being extremely permeable to the pure juice, especially if a pressure sufficient to form a hard cake on the filter plates is employed, for example a pressure of at least fifteen pounds to the square inch.

3. The protection of the highly heated juice, with its contained impurities, from prolonged exposure to the oxidizing action of the atmosphere greatly reduces any tendency to form difficultly removable colored compounds either due to caramelization or otherwise and consequently any necessity for a decolorizing treatment with deleterious chemicals is avoided.

4. Owing to the high purity of the juice obtained in my process there is a considerable saving over the present process in the expense required by cleaning the evaporators.

5. In this process, contrary to expectations when filtering all of the juice, it is possible to secure very thorough clarification of the juice by employing a very small effective filtering surface, viz, of but from 110 to 120 square feet per metric ton of juice.

6. The deterioration of the raw sugar itself produced by my method even after long periods of storage, as may be determined by polarization, is minimized. When one considers that in the island of Cuba alone the loss from deterioration of the raw sugar has been estimated at five million dollars per annum, the importance of this feature can be appreciated such improvement, due to my process, can be attributed, it is believed, to the extremely low content of bagacillio in the raw sugar which not only admits of more effective sterilization of the juice but also precludes any decomposition being promoted by the catalytic or other action of these fine solid impurities.

7. Owing to the high temperatures which are maintained in my process until the separation of the clear juice from the mud occurs, the sterilization and clarification are very complete and, it has been found that thereby the stability or keeping qualities of the clarified juice in very materially increased.

The expression in the claims "confining the juice against exposure to external atmospheric conditions" has reference to the protection of the highly heated juice from the oxidizing action of the atmosphere, which is highly deleterious as hereinbefore explained.

The term "fine fibrous particles" as well as the term "bagacillio" as used in the claims refers to the fibrous particles of a size sufficiently small to pass thru a coarse screen or strainer upon the preliminary straining of the juice to remove the coarse material as herein described, such for example as a strainer or screen containing about 225 apertures per square inch each from .03″ to .04″ in diameter.

Having thus described my invention, what I claim and desire to secure by U. S. Letters Patent is:

1. The method of purifying impure sugar cane juice, which consists in subjecting such juice which has been previously rendered substantially neutral and while containing a majority of the fine fibrous particles existent in the raw juice to a temperature in excess of 70° C., and a pressure sufficient to prevent active ebullition of the juice at such temperature, then conducting the heated juice without exposure thereof to the external atmosphere and while still subjected to a pressure sufficient to prevent ebullition thereof, to a filtering medium and releasing the pressure and recovering the resultant effluent juice from said filtering medium.

2. In the method of purifying impure sugar cane juice containing bagacillio and in a substantially neutral condition, the step which consists in heating such juice above the coagulating point of albumen in a closed receptacle and under a pressure sufficient to prevent active ebullition thereof at the temperature of treatment and then conducting such juice without exposure thereof to the external atmosphere and without permitting sedimentation thereof through a filtering medium.

3. The method of purifying impure sugar can juice, which consists in subjecting such juice which has been previously rendered substantially neutral and while containing a majority of the fine fibrous particles existent in the raw juice to a fluid pressure of not less than 15 pounds per square inch in excess of atmospheric and to a temperature substantially in excess of 100° C., then conducting the heated juice without exposure thereof to the external atmosphere and without substantial cooling thereof and while still subjected to a super-atmospheric pressure through a filtering medium.

4. The method of clarifying impure neutralized sugar cane juice, which consists in filtering impure juice containing a majority of the bagacillio that were normally present in such juice when in a freshly extracted state, while maintaining such juice at a temperature in excess of 70° C. and then recovering the effluent juice.

5. The method, which consists in substantially neutralizing the normal acidity of impure juice extracted from the sugar cane containing a majority of the fine sugar cane fibres that were normally present in such juice when in a freshly extracted state, heating such juice to a temperature in excess of 70° C., and; maintaining a super-atmospheric pressure upon the juice throughout the heating treatment, then, prior to the substantial exposure of such juice to external atmospheric conditions, effecting the accumulation of substantially all of the contained fibrous material on a filtering medium which is freely permeable to the liquid juice and repeatedly passing fresh portions of similarly heated juice through such filtering medium and the fibrous mass thereon accumulated.

6. In the process of purifying impure sugar cane juice, the steps which consist in heating the impure juice, which has been previously rendered substantially neutral and while still containing a majority of the bagacillio that were normally present in the juice when in a freshly extracted state, to a temperature sufficient to effect substantial coagulation of the albuminous matters therein and then, while constantly confining the juice against exposure to external atmospheric conditions, subjecting the same to a filtering operation.

7. The method of purifying impure sugar cane juice, which consists in subjecting such juice, while still containing a majority of the bagacillio that were normally present in the juice when in a freshly extracted state, to the neutralizing action of sufficient milk of lime to satisfy the acid reacting compounds in said juice, then heating the same to a temperature in excess of 105° C., while under a pressure sufficient to prevent ebullition of the juice and not less than 25 pounds per square inch in excess of atmospheric heating such juice while the same is flowing, and then, without interrupting the flow of such juice, causing such juice to pass through a filtering medium which is substantially impervious to the bagacillio and readily permeable to the liquid juice, while still maintaining a pressure of at least 15 pounds to the square inch in excess of atmospheric upon the juice during such filtration, and then recovering the resultant effluent juice.

Signed at Frederiksted, Island of St. Croix, Virgin Islands, U. S. A., this 8th day of July, 1920.

CARL J. G. SÓRENSEN.